3,256,103
REFRACTORY ARTICLE
Martin A. Roche, Jr., and Joseph C. Fisher, Jr., Fostoria, Ohio, assignors to Union Carbide Corporation, a corporation of New York
No Drawing. Filed May 20, 1963, Ser. No. 281,804
4 Claims. (Cl. 106—55)

The present invention relates to articles having improved properties at elevated temperatures. More particularly, the present invention relates to articles which are made from mixtures of boron nitride, titanium diboride, and titanium nitride and which have improved high temperature properties.

Mixtures of boron nitride and titanium diboride have previously been used in the manufacture of articles such as aluminum vaporization crucibles and boats.

While such articles are characterized by advantageous high temperature properties, there is a continuing need to provide improvements in such articles, particularly increased resistance to thermal cracking at high temperatures.

It is an object of the present invention to provide refractory articles having superior resistance to thermal cracking at elevated temperatures.

It is another object of the present invention to provide refractory articles having uniform density and electrical resistance.

It is a further object of the present invention to provide a refractory article which is substantially unaffected by moisture during storage under atmospheric conditions.

Other objects will be apparent from the following description and claims.

An article in accordance with the present invention is a hot pressed mixture of titanium boride, boron nitride and titanium nitride.

The ranges for the different constituents are as follows:

| | Percent |
|---|---|
| $TiB_2$ | 10–89 |
| BN | 10–89 |
| TiN | 1–10 |

In the practice of the present invention, commercially available $TiB_2$, BN and TiN powders are blended, for example by a V-type blender with an intensifier bar, to provide a uniform mixture. The particle sizes of the mixture are suitably 5 to 10 microns average. The ratio of $TiB_2$ to BN in the mixture can be varied to provide the desired electrical resistivity or other properties in the final product; for example, increasing the amount of BN in the mixture increases the electrical resistivity of the final product.

The amount of TiN provided in the mixture is 1 to 10 percent by weight. With a $TiB_2$—BN mixture having a carbon+oxygen content of about 2–4%, about 4% of TiN provides optimum results. For greater amounts of carbon+oxygen impurities in the mixture, larger amounts of TiN are used and vice versa.

When the proper mixture has been prepared in accordance with the present invention, the material is charged to a suitable mold, e.g. a graphite mold, and the charge is fired under pressure. The usual conditions used for hot pressing $TiB_2$—BN mixtures can be used, e.g. 1800° C. to 2050° C. and 0.5 to 1.4 tons per square inch. As a result of the hot pressing operation, the carbon and oxygen impurities are reacted with the admixed TiN and are thereby converted into a form which has been found to be non-detrimental to the properties of the formed article at high temperatures. The article thus produced is readily fabricated into crucibles and boats for aluminum vaporization which are characterized by superior resistance to thermal cracking. Also, articles prepared in accordance with the present invention are highly resistant to the effect of moisture during storage in ambient atmosphere.

By way of example, mixtures of $TiB_2$ and BN, with and without TiN additions, were hot pressed by the same technique (1850° C.±50° C. and 1 ton per in.²) and tested at elevated temperatures to determine their respective properties. The hot pressed articles were in the form of cylindrical plugs 10" long x 4.8" in diameter.

The results are shown in Table I.

TABLE I

| | $TiB_2$, Wt. percent | BN, Wt. percent | Carbon plus Oxygen Impurities in Mixture, Wt. percent | | TiN, Wt. percent | Permanent Expansion [1] at 1,800° C. in./in. × 10⁻³ | Rupturing Temperature | Carbon plus Oxygen Impurities in Hot Pressed Articles | |
|---|---|---|---|---|---|---|---|---|---|
| | | | C | $O_2$ | | | | C | $O_2$ |
| I | 50 | 50 | 0.67 | 2.1 | 0 | 12.8 | 1,810 | 0.7 | 2.8 |
| II | 49 | 49 | | | 2 | 8.8 | 1,900 | | |
| III | 46 | 50 | 0.7 | 2.1 | 4 | 6.1 | 2,100 | 0.67 | 2.4 |
| IV | 49 | 43 | | | 8 | 7.2 | 1,850 | | |

[1] Measured parallel to direction of pressing.

The $TiB_2$ and BN materials employed in the practice of the present invention are the commercially available materials and a 1:1 $TiB_2$—BN mixture ordinarily contains between 3–4% of carbon+oxygen as impurities. It is believed that it is the presence of oxygen and carbon impurities in the BN and $TiB_2$ material which is responsible for the high temperature failure of hot pressed $TiB_2$—BN articles and it has been discovered, as part of the present invention, that the use of TiN in mixture with BN and $TiB_2$ substantially improves the high temperature properties of hot pressed $TiB_2$—BN articles.

The permanent expansion was measured by heating a 2½" x ½" x ½" sample to 1800° C., allowing it to cool to room temperature, and measuring the change in length of the longest dimension. The samples were cut from the 4.8" diameter x 10" long hot pressed plugs with the 2½" dimension parallel to the direction of pressing. The cracking temperature was determined by resistance heating a sample bar in vacuum until it ruptured.

It can be seen that TiN additions, in accordance with the present invention, provide a substantial increase in thermal stability. By way of example, an aluminum vaporizer prepared from the material indicated as III in Table I and in the same manner, operated at an aluminum vaporization rate of 6.3 gms./min./in.$^2$ for 12 hours without cracking. Vaporizers made in the same way from the same TiB$_2$ and BN material, without TiN additions, cracked and failed in about one hour at the same aluminum vaporization rate.

The following example is provided to illustrate the practice of the present invention in the manufacture of aluminum vaporization boats.

*Example I*

TiB$_2$ powder containing about 1% O$_2$ and 0.5% carbon as impurities, and BN powder containing about 2% O$_2$ and 0.1% carbon as impurities were mixed in a 1:1 weight ratio to provide an average resistivity of 850$\mu$ ohm cm. in the final product. (The TiB$_2$/BN ratio controls the resistivity of the final article and can be determined by routine testing.) TiN in the amount of 4% by weight was added to the blended mixture in accordance with the present invention.

The mixture was then charged to a graphite mold and hot pressed at 1900° C. under a pressure of one ton/in.$^2$. Samples of the resultant article were tested and found to have cracking temperatures of over 2000° C.

Samples of the article were also exposed to 92% relative humidity at room temperature for 11 days, and subsequently heated to 1500° C. under vacuum. These samples exhibited only very slight surface spalling. Similar material, without any TiN addition, processed and tested in the same manner, completely exfoliated when heated, at a temperature below 600° C.

It can thus be seen that in addition to improving resistance to thermal cracking, TiN additions in accordance with the present invention also reduce the undesirable hygroscopicity of TiB$_2$—BN articles.

The following Table II shows a further comparison of average properties of hot pressed TiB$_2$—BN articles prepared with and without TiN additions. The articles tested were formed by pressing at 1 ton per in.$^2$ at a temperature of 1850° C.±50°. All articles were made from the same lots of TiB$_2$ and BN material. The carbon+oxygen content of the BN—TiB$_2$ mixes was 2–4% and the TiN additions were 4%.

TABLE II

| Composition | 45–55% BN 45–55% TiB$_2$ | 45–55% BN 45–55% TiB$_2$+4% TiN |
|---|---|---|
| Density, gms./cc. | 2.70–2.80 | 2.80–2.90. |
| Resistivity, $\mu$ ohm cm. (1,500° C.) | 2,500–3,500 | 2,500–3,500. |
| Flexural Strength, p.s.i. | 3,000 (1,500° C.) / 4,000 (1,800° C.) | 3,500 (1,500° C.). / 5,500 (1,800° C.). |
| Permanent Expansion, in./in.×10$^{-3}$ (1,800° C): | | |
|   Perpendicular to Direction of Pressing. | 4.0–5.0 | 1.0–2.0. |
|   In Direction of Pressing | 9.0–10.0 | 5.0–7.0. |
| Rupture Temperature when heated by own resistance in vacuo. | 1,650–1,800° C | 2,000–2,150° C. |
| Moisture Sensitivity (2 weeks at 92% R.H. at room temperature followed by heating in vacuo). | Exfoliated at 600° C | Very slight surface spalling at 1,800° C. |

In addition to the previously mentioned advantage of high temperature stability, the article of the present invention has highly uniform density, electrical resistance and mechanical integrity throughout the mass which is an important advantage over TiB$_2$—BN articles which do not contain TiN additions in accordance with the present invention.

What is claimed is:

1. An article of manufacture formed by hot pressing a mixture consisting essentially of 10–89% titanium boride, 10–89% boron nitride, and 1 to 10% titanium nitride.

2. An article of manufacture formed by hot pressing a mixture consisting essentially of 10–89% titanium boride, 19–89% boron nitride, and 1 to 10% titanium nitride, said article being characterized by having a rupture temperature not less than 2000° C. and a low permanent expansion at elevated temperatures.

3. An article of manufacture formed by hot pressing a mixture consisting essentially of 10–89% titanium boride, 10–89% boron nitride, and about 4% titanium nitride, said titanium boride and boron nitride having an initial aggregate carbon+oxygen impurity content of about 2 to 4%.

4. An article of manufacture formed by hot pressing a mixture consisting essentially of titanium boride, boron nitride, and about 4% titanium nitride, said titanium boride and boron nitride being in a proportion of about 1:1 and having an initial aggregate carbon+oxygen impurity content of about 2 to 4%.

References Cited by the Examiner

UNITED STATES PATENTS 3,003,885   10/1961   Mandorf  ---------- 252—520

TOBIAS E. LEVOW, *Primary Examiner.*

J. POER, *Assistant Examiner.*